US011377008B2

(12) United States Patent
Kato et al.

(10) Patent No.: US 11,377,008 B2
(45) Date of Patent: Jul. 5, 2022

(54) VEHICLE SEAT

(71) Applicant: NHK Spring Co., Ltd., Kanagawa (JP)

(72) Inventors: Kazuhito Kato, Kanagawa (JP); Kousuke Suzuki, Kanagawa (JP); Chikanori Honda, Kanagawa (JP)

(73) Assignee: NHK SPRING CO., LTD., Kanagawa (JP)

( * ) Notice: Subject to any disclaimer, the term of this patent is extended or adjusted under 35 U.S.C. 154(b) by 0 days.

(21) Appl. No.: 16/713,094

(22) Filed: Dec. 13, 2019

(65) Prior Publication Data

US 2020/0207248 A1 Jul. 2, 2020

(30) Foreign Application Priority Data

Dec. 27, 2018 (JP) .............................. JP2018-245937

(51) Int. Cl.
| | | |
|---|---|---|
| B60N 2/90 | (2018.01) | |
| B60N 2/68 | (2006.01) | |
| B60N 2/64 | (2006.01) | |
| B60N 2/58 | (2006.01) | |
| B60N 2/80 | (2018.01) | |

(52) U.S. Cl.
CPC ............... *B60N 2/986* (2018.02); *B60N 2/58* (2013.01); *B60N 2/643* (2013.01); *B60N 2/68* (2013.01); *B60N 2/80* (2018.02)

(58) Field of Classification Search
CPC ........ B60N 2/986; B60N 2/643; B60N 2/646; B60N 2/62; B60N 2/4242; B60N 2/68
See application file for complete search history.

(56) References Cited

U.S. PATENT DOCUMENTS

| | | | | |
|---|---|---|---|---|
| 7,708,343 | B2 * | 5/2010 | Kayumi ................. | B60N 2/914 297/284.9 |
| 9,004,605 | B2 * | 4/2015 | Nishiyama ............. | B60N 2/646 297/452.27 |
| 9,701,228 | B2 * | 7/2017 | Takahashi .............. | B60N 2/643 |
| 10,227,028 | B1 * | 3/2019 | Wang ..................... | B60N 2/914 |

(Continued)

FOREIGN PATENT DOCUMENTS

| | | | | |
|---|---|---|---|---|
| CA | 2338999 A1 * | 2/2000 | ............... | B60N 2/99 |
| DE | 1654255 A1 * | 7/1971 | ............... | A47C 7/18 |

(Continued)

OTHER PUBLICATIONS

Japanese Office Action (w/ English translation) for corresponding Japanese Application No. 2018-245937, dated Mar. 2022, 6 pages.

*Primary Examiner* — Timothy J Brindley
(74) *Attorney, Agent, or Firm* — Dority & Manning, P.A.

(57) ABSTRACT

At a vehicle seat, resistance to relative displacement of a passenger in a left-right direction is larger at both left-right direction side portions of a front surface of an upper portion of a backrest than at a left-right direction central portion. Further, a seat cushion has left and right side reinforcing portions that reinforce portions of a cushion pad from outer sides in a left-right direction, and from obliquely lower sides, of front-rear direction central portions of thigh portions of the passenger, and left and right lower surface reinforcing portions that reinforce portions of a lower surface of the cushion pad at outer sides in a left-right direction, and at obliquely lower sides, of buttock portions of the passenger.

9 Claims, 8 Drawing Sheets

(56) References Cited

U.S. PATENT DOCUMENTS

| | | | | |
|---|---|---|---|---|
| 10,960,794 B1* | 3/2021 | Booth | | B60N 2/5621 |
| 2005/0225155 A1* | 10/2005 | Nakahara | | B60N 2/5621 |
| | | | | 297/452.42 |
| 2006/0152062 A1* | 7/2006 | Archambault | | B60N 2/99 |
| | | | | 297/452.34 |
| 2008/0061613 A1* | 3/2008 | Anikin | | B60N 2/0276 |
| | | | | 297/284.9 |
| 2009/0218858 A1* | 9/2009 | Lawall | | B60N 2/99 |
| | | | | 297/216.1 |
| 2016/0137108 A1 | 5/2016 | Takahashi et al. | | |
| 2017/0036579 A1* | 2/2017 | Line | | B60N 2/68 |
| 2017/0158088 A1* | 6/2017 | Pike | | B60N 2/62 |
| 2017/0355291 A1* | 12/2017 | Line | | B60N 2/68 |
| 2018/0272906 A1* | 9/2018 | Onuma | | B60N 2/682 |
| 2019/0031138 A1* | 1/2019 | Boccuccia | | B60N 2/646 |
| 2019/0070988 A1* | 3/2019 | Sung | | B32B 37/0053 |
| 2019/0176668 A1* | 6/2019 | Araki | | B60N 2/7017 |
| 2020/0037765 A1* | 2/2020 | Mizoi | | B60N 2/68 |
| 2020/0307428 A1* | 10/2020 | Kobayashi | | B60N 2/7094 |

FOREIGN PATENT DOCUMENTS

| | | | | |
|---|---|---|---|---|
| DE | 4305295 A1 * | 9/1993 | | B60N 2/4235 |
| DE | 102006018184 A1 * | 10/2007 | | A61H 9/0078 |
| DE | 202007000441 U1 * | 6/2008 | | B60N 2/448 |
| DE | 102008047698 A1 * | 3/2010 | | B60N 2/42709 |
| DE | 102008062449 B4 * | 3/2010 | | B60N 2/986 |
| DE | 102009020154 A1 * | 11/2010 | | B60N 2/986 |
| DE | 102010005801 A1 * | 6/2011 | | B60N 2/68 |
| DE | 102011119059 A1 * | 5/2013 | | B60N 2/686 |
| DE | 102014006183 A1 * | 10/2015 | | B60N 2/02 |
| DE | 102016218158 A1 * | 3/2017 | | A61H 9/0078 |
| EP | 2353928 A1 * | 8/2011 | | B60N 2/2222 |
| FR | 2965520 A1 * | 4/2012 | | B60N 2/68 |
| JP | 2008049837 A | 3/2008 | | |
| JP | 2013215476 A * | 10/2013 | | |
| JP | 2013215476 A | 10/2013 | | |
| JP | 2014205490 | 10/2014 | | |
| JP | 2015116835 A * | 6/2015 | | B60N 2/2222 |
| JP | 2016094072 | 5/2016 | | |
| WO | WO-9808705 A1 * | 3/1998 | | B60N 2/986 |
| WO | WO-2005047057 A2 * | 5/2005 | | B60N 2/0232 |
| WO | WO-2011124545 A1 * | 10/2011 | | B60N 2/0276 |
| WO | WO-2012086364 A1 * | 6/2012 | | B60N 2/888 |
| WO | WO-2014084283 A1 * | 6/2014 | | B60N 2/002 |
| WO | WO-2018173409 A1 * | 9/2018 | | B60N 2/7094 |

* cited by examiner

VEHICLE SEAT

CROSS-REFERENCE TO RELATED APPLICATION

This application is based on and claims priority under 35 USC 119 from Japanese Patent Application No. 2018-245937 filed on Dec. 27, 2018, the disclosure of which is incorporated by reference herein.

BACKGROUND

Technical Field

The present disclosure relates to a vehicle seat.

Related Art

In the vehicle seat control device disclosed in Japanese Patent Application Laid-Open (JP-A) No. 2008-49837, a vehicle seat control section (control device) computes acceleration in the lateral direction that arises at the vehicle, on the basis of the steering angle and the wheel speed, and sets the rotation angle of side supports in accordance with the computed acceleration in the lateral direction, and sets the rotation speed of the side supports in accordance with the supporting angle that has been set, and controls the driving of the side support actuator. Due thereto, the side supports of the backrest are rotated in accordance with the state of traveling, and the supporting performance is improved.

In the seat cushion pad disclosed in JP-A No. 2013-215476, high-hardness members, whose rigidities are higher than other regions within a urethane foamed body, are set so as to extend in the front-rear direction at only the places that support the left-right direction both end portions of the buttock portions of the passenger from beneath, or at only the places that support the left-right direction both end portions of the buttock portions and the thigh portions of the passenger from beneath. The upper surfaces of these high-hardness members are inclined downward while heading toward the left-right direction inner side. The inner side surfaces and the outer side surfaces in the left-right direction of the high-hardness members extend along the vertical direction. Further, the thickness of this seat cushion pad is set to be substantially equal at the regions where the high-hardness members are disposed and the region that is further toward the inner side than these, in a cross-section perpendicular to the left-right direction. Due thereto, both the ability to maintain the seated posture of the passenger at times of cornering and the like, and a good cushioning ability, are achieved.

SUMMARY

By the way, due to the pelvis of the passenger rolling at times of cornering of the vehicle or at times when the vehicle changes lanes, a phenomenon in which the upper body of the passenger tilts in the lateral direction (hereinafter called "wobbling" upon occasion) arises. On the other hand, at the time when the vehicle is traveling on an uneven, irregular road surface, the body of the passenger is vibrated left and right by the vehicle seat. Due to the head portion of the passenger moving later than the chest portion, a phenomenon in which accelerations of opposite phases arise at the head portion and the chest portion (hereinafter called "body shaking" upon occasion) arises.

With regard to this point, in the related art of aforementioned JP-A No. 2008-49837, there is a structure that rotates the side supports evenly in accordance with the acceleration in the lateral direction that arises at the vehicle. Therefore, it is difficult to achieve both suppression of wobbling and suppression of body shaking. Further, because the control device and the actuator for rotating the side supports are installed in the backrest, the structure is complex.

On the other hand, in the related art of aforementioned JP-A No. 2013-215476, rolling of the pelvis that is due to wobbling can be suppressed. However, because the cushion material that is positioned above the high-hardness members is extremely thin, there is the problem that the soft feel and the vertical stroke when sitting are impaired, and therefore the seating comfort (the riding comfort) deteriorates.

In view of the above-described circumstances, an object of the present disclosure is to provide a vehicle seat that can, by a simple structure, achieve both suppression of wobbling and suppression of body shaking, and that can ensure a good seating comfort.

A vehicle seat of a first aspect of the present disclosure includes a seat cushion that supports buttock portions and thigh portions of a passenger, and a backrest that supports a back portion of the passenger, wherein, at the backrest, resistance to relative displacement of the passenger in a left-right direction is larger at both left-right direction side portions of a front surface of an upper portion than at a left-right direction central portion thereof, and the seat cushion has left and right side reinforcing portions that reinforce portions of a cushion pad from outer side in a left-right direction, and from obliquely lower sides, of front-rear direction central portions of the thigh portions of the passenger, and left and right lower surface reinforcing portions that reinforce portions of a lower surface of the cushion pad at outer sides in a left-right direction, and at obliquely lower sides, of the buttock portions of the passenger.

Note that the front-rear, left-right, and vertical directions in the first aspect are the front-rear, left-right and vertical directions of the vehicle seat of the first aspect, and coincide with the front-rear, left-right and vertical directions of the passenger who is seated in the vehicle seat.

In the vehicle seat of the first aspect, at the front surface of the upper portion of the backrest, the resistance, with respect to relative displacement of the passenger in the left-right direction, is larger at both of the left-right direction side portions than at the left-right direction central portion. Therefore, when the vehicle travels on an uneven road surface, i.e., when the backrest vibrates in the left-right direction at a high acceleration and a small amplitude, due to the left-right direction both side portions of the front surface of the upper portion of the backrest (the regions where the above-described resistance is set to be large) not contacting the upper portion of the back portion (the back) of the passenger, the exciting force that is transmitted from the upper portion of the backrest to the back portion of the passenger is reduced. Due thereto, "body shaking" can be suppressed.

On the other hand, at the time of cornering of the vehicle or at the time when the vehicle changes lanes, i.e., at the time when the upper body of the passenger tilts in the left-right direction (the lateral direction) at a low acceleration and a large amplitude, due to the left-right direction both side portions of the front surface of the upper portion of the backrest (the regions where the above-described resistance is set to be large) contacting the upper portion of the back portion of the passenger, the upper body of the passenger is supported well by the backrest. Due thereto "wobbling" can be suppressed.

Further, at the vehicle seat, the left and right side reinforcing portions of the seat cushion reinforce portions of the cushion pad at the left-right direction outer sides and obliquely lower sides of the front-rear direction central portions of the thigh portions of the passenger. Due thereto, it is easy for the passenger to transmit the force of the thigh portions to the left-right direction both side portions of the seat cushion, and it is easy to support the upper body by the force of the thigh portions. Therefore, "wobbling" can be suppressed more.

Further, at the vehicle seat, the left and right lower surface reinforcing portions of the seat cushion reinforce portions of the lower surface of the cushion pad at the left-right direction outer sides and obliquely lower side of the buttock portions of the passenger. Due thereto, deformation of the cushion pad at the left-right direction outer sides and obliquely lower side of the buttock portions of the passenger is suppressed, and rolling of the pelvis of the passenger is suppressed. Therefore, "wobbling" can be suppressed even more.

Furthermore, at the vehicle seat, as described above, portions of the cushion pad are reinforced at the left-right direction outer sides and obliquely lower sides of the front-rear direction central portions of the thigh portions, and portions of the lower surface of the cushion pad are reinforced at the left-right direction outer sides and obliquely lower side of the buttock portions. Therefore, the seating comfort is good as compared with, for example, a structure in which the cushion pad is reinforced beneath the thigh portions and the buttock portions.

Due to the above, in accordance with the present disclosure, both suppressing of wobbling and suppressing of body shaking can be achieved, and a good seating comfort can be ensured. Moreover, because there is no need to install a control device or an actuator or the like in the backrest, the structure can be made to be simple.

In a vehicle seat of a second aspect, in the vehicle seat of the first aspect, left and right back side supporting portions, which project outward toward a front side of the backrest at a location that is further toward a lower side than an upper portion of a chest portion of the passenger and at a height corresponding at least to a lower portion of the chest portion of the passenger, are provided at both left-right direction both side portions of the backrest.

Note that the height corresponding to the "lower portion of the chest portion" in the second embodiment is, for example, a height at which the seventh rib and the eighth rib are positioned at the side portions of the torso of the passenger who is seated in the vehicle seat of the second aspect.

Further, in the vehicle seat of the second aspect, at the time when the upper body of the passenger is swung in the rolling direction with his/her pelvis being the fulcrum when the vehicle is traveling on an uneven road surface or the like, first, the lower portion of the chest portion is supported by (abuts) the back side supporting portions. Due thereto, as compared with a structure in which, first, the upper portion of the chest portion or the abdominal region is supported by the back side supporting portions, input to the thorax is dodged, and vibration of the chest portion and the head portion is suppressed. Therefore, "body shaking" can be suppressed more.

In a vehicle seat of a third aspect, in the vehicle seat of the first aspect, the front surface of the upper portion of the backrest is formed in an arc that is concave toward a rear side of the backrest as seen in a plan view.

In the vehicle seat of the third aspect, the front surface of the upper portion of the backrest is formed in an arc such as that described above. Due thereto, the above-described resistance can be set by a simple structure.

In a vehicle seat of a fourth aspect, in the vehicle seat of the first aspect, inclined surfaces, which are inclined toward a front side of the backrest on progression toward outer side in a left-right direction, are formed at both of the left-right direction both side portions of the front surface of the upper portion of the backrest.

In the vehicle seat of the fourth aspect, inclined surfaces such as those described above are formed at both of the left-right direction side portions of the front surface of the upper portion of the backrest. Due thereto, the above-described resistance can be set by a simple structure.

In a vehicle seat relating to a fifth aspect of the present disclosure, in the vehicle seat of the first aspect, a coefficient of friction of both of the left-right direction side portions of the front surface of the upper portion of the backrest is higher than at a left-right direction central portion of the front surface of the upper portion of the backrest.

In the vehicle seat of the fifth aspect, coefficients of friction are set as described above at the front surface of the upper portion of the backrest. Due thereto, the above-described resistance can be set by a simple structure.

In a vehicle seat of a sixth aspect, in the vehicle seat of the first aspect, the left and right side reinforcing portions comprise left and right side high-hardness members that are formed from foamed bodies of higher rigidities than the cushion pad, and that are embedded in the cushion pad at left-right direction outer sides, and at obliquely lower sides, of the front-rear direction central portions of the thigh portions of the passenger.

In the vehicle seat of the sixth aspect, the left and right side high-hardness members, which are formed from foamed bodies of higher rigidities than the cushion pad, are embedded in the cushion pad at left-right direction outer sides and obliquely lower sides of the front-rear direction central portions of the thigh portions of the passenger. Due thereto, portions of the cushion pad are reinforced at the left-right direction outer sides and obliquely lower sides of the front-rear direction central portions of the thigh portions of the passenger, and therefore, the left and right side reinforcing portions can be made to be simple structures.

In a vehicle seat of a seventh aspect, in the vehicle seat of the first aspect, the left and right side reinforcing portions comprise left and right supporting frames that are disposed at left-right direction outer sides, and obliquely lower sides, of the front-rear direction central portions of the thigh portions of the passenger, that are fixed to left and right side frames of the seat cushion, and that support the cushion pad from a lower side.

In the vehicle seat of the seventh aspect, the left and right supporting frames, which are disposed at left-right direction outer sides and obliquely lower sides of the front-rear direction central portions of the thigh portions of the passenger, are fixed to the left and right side frames of the seat cushion, and support the cushion pad from the lower side. Due thereto, portions of the cushion pad are reinforced from the left-right direction outer sides and obliquely lower sides of the front-rear direction central portions of the thigh portions of the passenger, and therefore, the left and right side reinforcing portions can be made to be simple structures.

In a vehicle seat of an eighth aspect, in the vehicle seat of the first aspect, further comprising a wire frame, wherein, the wire frame is embedded within an outer peripheral portion of the cushion pad, left and right side portions of the wire frame are bent so as to be convex toward left-right direction outer sides and an upper side, and the left and right side reinforcing portions are structured by regions of the left and right side portions which regions are disposed at left-right direction outer sides, and at obliquely lower sides, of the front-rear direction central portions of the thigh portions of the passenger.

In the vehicle seat of the eighth aspect, the left and right side portions of the wire frame, which is embedded within the outer peripheral portion of the cushion pad, are bent so as to be convex toward the left-right direction outer sides and the upper side. Further, portions of the left and right side portions are disposed at the left-right direction outer sides and obliquely lower sides of the front-rear direction central portions of the thigh portions of the passenger. Due thereto, portions of the cushion pad are reinforced at the left-right direction outer sides and obliquely lower sides of the front-rear direction central portions of the thigh portions of the passenger, and therefore, the left and right side reinforcing portions can be made to be simple structures.

In a vehicle seat of a ninth aspect, in the vehicle seat of the first aspect, the left and right lower surface reinforcing portions comprise left and right supporting plates that are disposed at left-right direction outer sides, and at obliquely lower sides, of the buttock portions of the passenger, that are fixed to left and right side frames of the seat cushion, and that support a lower surface of the cushion pad by means of upper surfaces that are inclined at a downward slopes toward a seat left-right direction central side.

In the vehicle seat of the ninth aspect, the left and right supporting plates, that are disposed at the left-right direction outer sides and obliquely lower side of the buttock portions of the passenger, are fixed to the left and right side frames of the seat cushion. These left and right supporting plates support the lower surface of the cushion pad by means of upper surfaces that are inclined at the downward slopes toward the seat left-right direction central side. Due thereto, portions of the lower surface of the cushion pad are reinforced at the left-right direction outer sides and obliquely lower side of the buttock portions of the passenger, and therefore, the left and right lower surface reinforcing portions can be made to be simple structures.

In a vehicle seat of a tenth aspect, in the vehicle seat of the first aspect, the left and right lower surface reinforcing portions comprise left and right lower surface high-hardness members that are formed from foamed bodies of higher rigidity than the cushion pad, and that are disposed at left-right direction outer sides, and at obliquely lower sides, of the buttock portions of the passenger, and whose upper surfaces, which are inclined at a downward slopes toward a seat left-right direction central side, are fixed to a lower surface of the cushion pad.

In the vehicle seat of the tenth aspect, the left and right lower surface high-hardness members, which are formed from foamed bodies of higher rigidities than the cushion pad, are disposed at the left-right direction outer sides and obliquely lower side of the buttock portions of the passenger. The upper surfaces, which are inclined at the downward slopes toward a seat left-right direction central side, of these left and right lower surface high-hardness members are fixed to the lower surface of the cushion pad. Due thereto, portions of the lower surface of the cushion pad are reinforced at the left-right direction outer sides and obliquely lower side of the buttock portions of the passenger, and therefore, the left and right lower surface reinforcing portions can be made to be simple structures.

As described above, in the vehicle seat relating to the present disclosure, both suppression of wobbling and suppression of body shaking can be achieved by a simple structure, and a good seating comfort can be ensured.

BRIEF DESCRIPTION OF THE DRAWINGS

Exemplary embodiments of the present invention will be described in detail based on the following figures, wherein.

DETAILED DESCRIPTION

Figure 1:
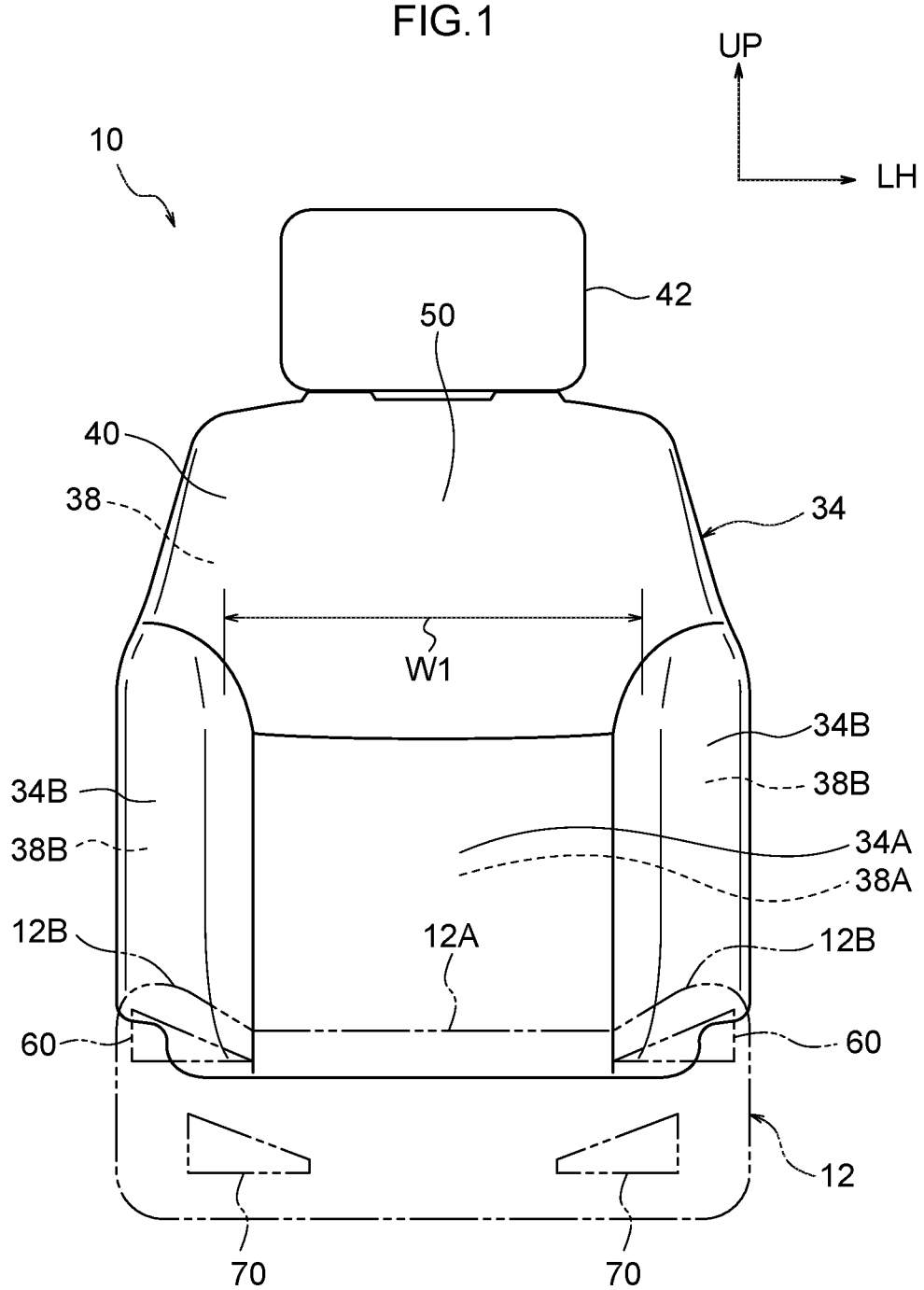
FIG. 1 is a front view showing the structure of a vehicle seat relating to an embodiment of the present disclosure.

A vehicle seat 10 relating to an embodiment of the present disclosure is described hereinafter by using FIG. 1 through FIG. 13. Note that there are cases in which some of the reference numerals are omitted from the drawings in order to make the drawings easier to understand. Further arrows FR, UP, LH that are shown appropriately in the respective drawings indicate the front side, the upper side and the left side of the vehicle seat 10, respectively. Hereinafter, when description is given by merely using front-rear, left-right and vertical directions, they refer to the directions with respect to the vehicle seat 10, unless otherwise indicated.

(Structure)

Figure 2:
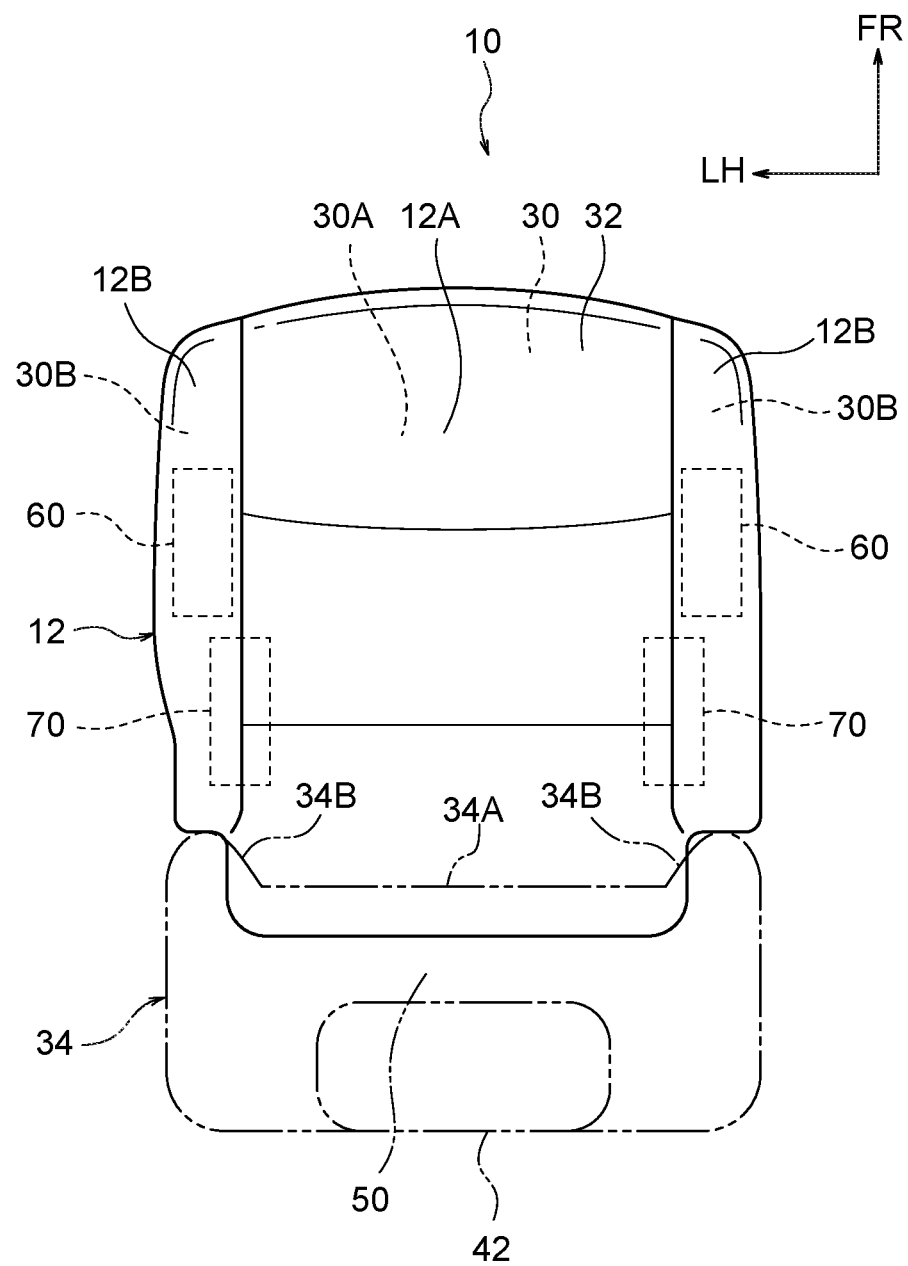
FIG. 2 is a plan view showing the structure of the vehicle seat relating to the embodiment of the present disclosure.
Figure 3:
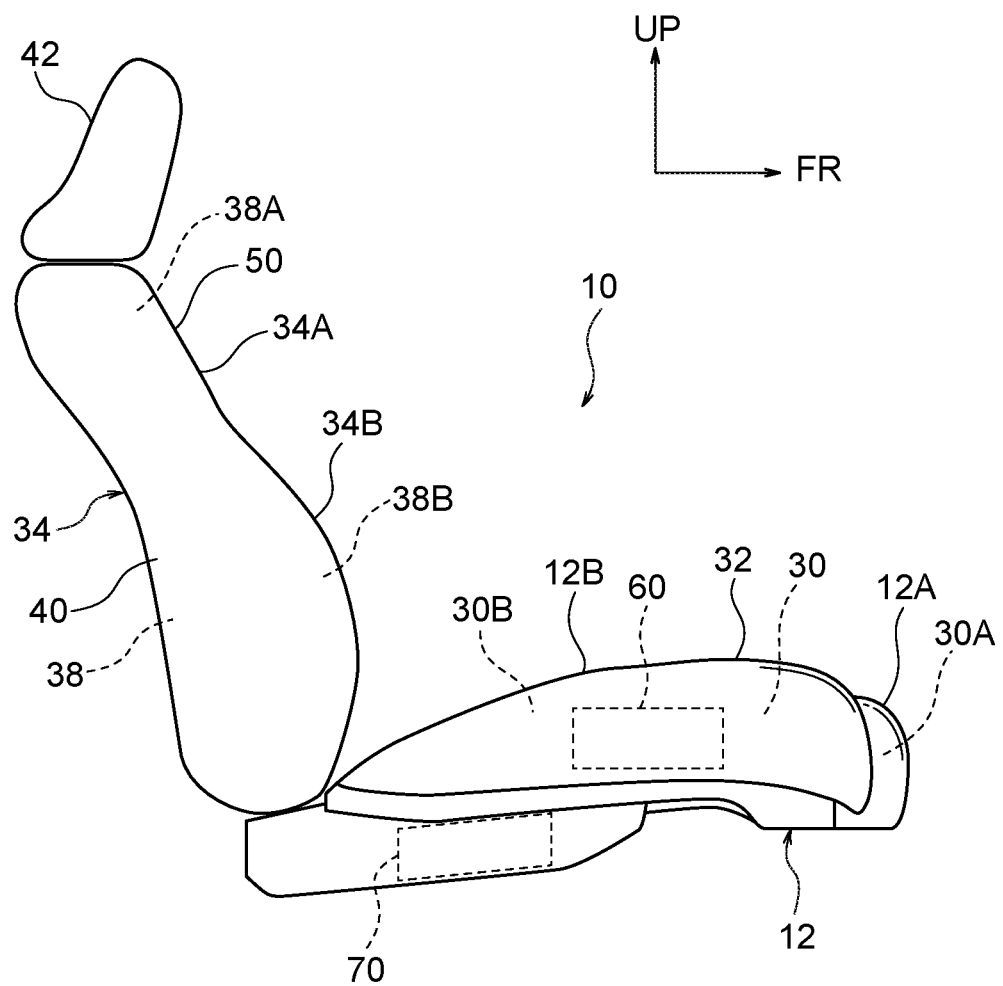
FIG. 3 is a side view showing the structure of the vehicle seat relating to the embodiment of the present disclosure.

As shown in FIG. 1 through FIG. 3, the vehicle seat 10 relating to the present embodiment has a seat cushion 12 that supports buttock portions H and thigh portions F of a passenger P (see FIG. 12 and FIG. 13) who is seated in the vehicle seat 10, a backrest 34 that supports a back portion B of the passenger P, and a headrest 42 that supports a head portion (not illustrated) of the passenger P.

The front surface of the upper portion of the backrest 34 is a supporting force adjusting surface 50 (see FIG. 4 through FIG. 6) at which the resistance, with respect to relative displacement of the passenger P in the left-right direction, is set to be lower at the left-right direction central portion than at the left-right direction both side portions. Left and right back side supporting portions 34B, which project-out toward the front side of the backrest 34 at a height corresponding to a range from the lower portion of a chest portion C to a lumbar region W of the passenger P, are provided at the left-right direction both side portions of the backrest 34.

The seat cushion 12 has left and right side reinforcing portions 60 (see FIG. 7 through FIG. 9) that reinforce portions of a cushion pad 30 at the left-right direction outer sides and obliquely lower sides of the front-rear direction central portions of the thigh portions F of the passenger P, and left and right lower surface reinforcing portions 70 that reinforce portions of the lower surface (the reverse surface) of the cushion pad 30 at the left-right direction outer sides and obliquely lower side of the buttock portions H of the passenger P.

Note that the passenger P has a physique corresponding to, for example, a JM50 (a 50th percentile Japanese adult male), and sits in the vehicle seat 10 in a standard seated posture. Further, the front-rear, left-right and vertical directions of the vehicle seat 10 coincide with the front-rear, left-right and vertical directions of the vehicle in which the vehicle seat 10 is installed. Hereinafter, summaries of the overall structures of the seat cushion 12 and the backrest 34 are described first, and thereafter, the main portions of the present embodiment are described.

(Overall Structure of Seat Cushion)

The seat cushion 12 has a cushion main body portion 12A that supports the buttock portions H and the thigh portions F of the passenger P from the lower side, and left and right cushion side supporting portions 12B that support the buttock portions H and the thigh portions F of the passenger P from the left-right direction outer sides. The seat cushion 12 is structured to include a cushion frame 14 (see FIG. 8 and FIG. 10) that is a frame member, the cushion pad 30 that is supported at the cushion frame 14, and a cushion skin 32 that covers the cushion pad 30.

Figure 8:
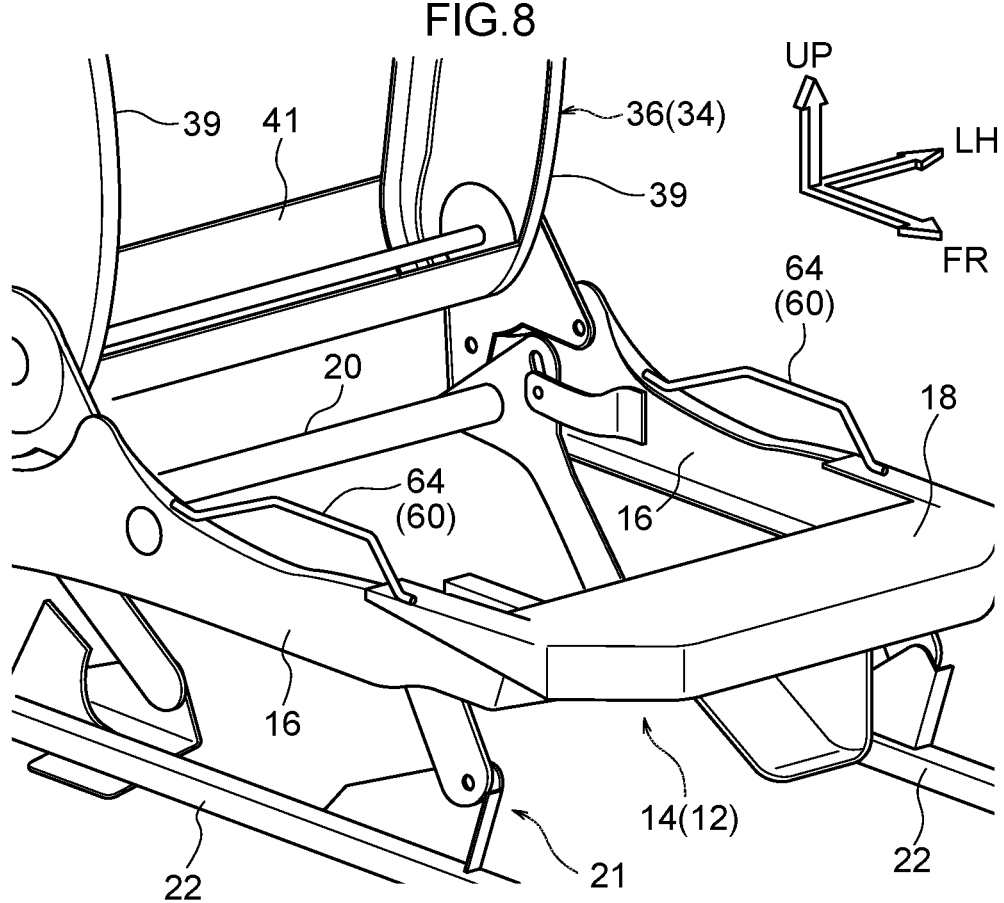
FIG. 8 is a perspective view showing an example in which supporting frames are side reinforcing portions.
Figure 10:
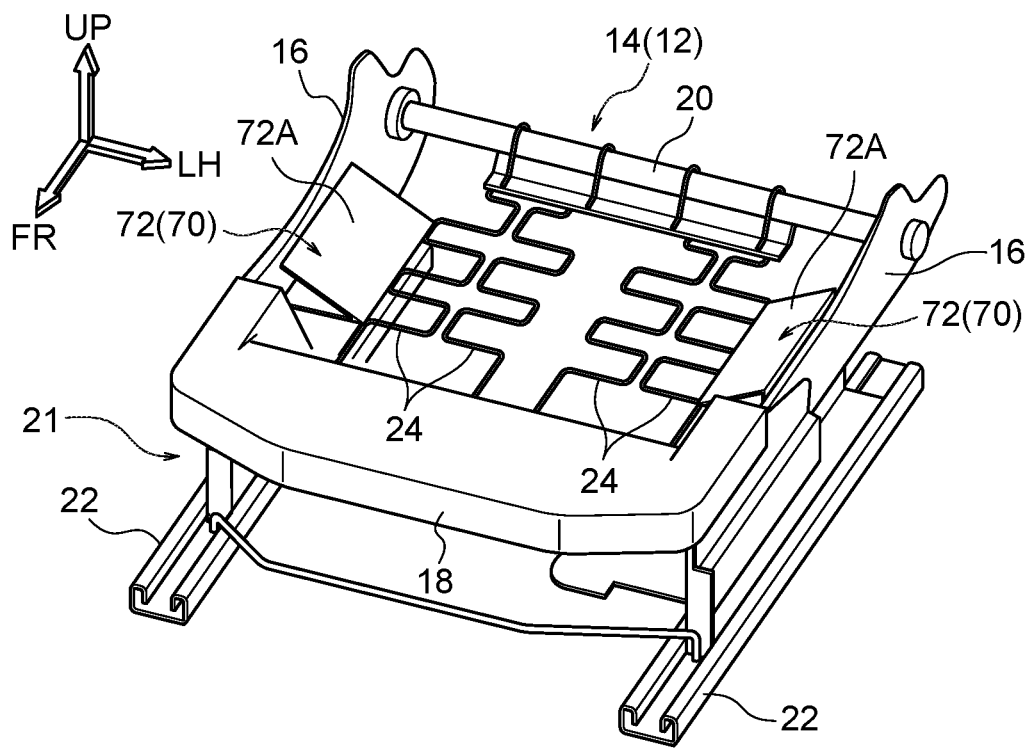
FIG. 10 is a perspective view showing an example in which supporting plates are lower surface reinforcing portions.

As shown in FIG. 8 and FIG. 10, the cushion frame 14 has a pair of left and right side frames 16 that extend in the seat front-rear direction at the left and right side portions of the seat cushion 12, a front frame 18 that spans between the upper end portions of the front portions of the left and right side frames 16, and a rear frame 20 that spans between the rear end portions of the left and right side frames 16.

The left and right side frames 16 are formed, for example, in elongated shapes and by metal plates, and are disposed in postures in which the length directions thereof run along the front-rear direction and the thickness directions thereof run along the left-right direction. These side frames 16 are connected to the floor portion of the vehicle body via a lifter mechanism 21 and left and right sliding rails 22. The front frame 18 is formed, for example, in a substantially rectangular shape and by a metal plate, and is disposed in a posture in which the thickness direction thereof runs along the vertical direction. The left-right direction both end portions of the front frame 18 are fixed by means such as welding or the like to the front portions of the left and right side frames 16. The rear frame 20 is formed by a metal pipe, and is disposed in a posture in which the axial direction thereof runs along the seat width direction. The seat width direction both end portions of the rear frame 20 are connected to the rear end portions of the left and right side frames 16 by means such as caulking or the like. Plural S-springs 24 (see FIG. 10, not shown in FIG. 8) that are lined-up along the left-right direction span between the front frame 18 and the rear frame 20.

The cushion pad 30 is structured by a foamed body of urethane foam or the like for example, and is attached to the cushion frame 14 from the upper side. The cushion pad 30 is supported from the lower side by the cushion frame 14 and the plural S-springs 24. The cushion pad 30 is structured by a cushion pad main body portion 30A that structures the cushion main body portion 12A, and left and right cushion pad side portions 30B that structure the left and right cushion side supporting portions 12B. The left and right cushion pad side portions 30B bulge-out further toward the upper side than the cushion pad main body portion 30A, and are molded in shapes that ensure the ability to support the side portions of the buttock portions H and the thigh portions F of the passenger P. The cushion skin 32 that covers the cushion pad 30 is formed in the shape of a bag by plural fabric pieces of cloth, leather, synthetic leather, PVC or the like being sewn together.

(Overall Structure of Backrest)

The backrest 34 has a back main body portion 34A that supports the back portion B of the passenger P from the rear side, and the left and right back side supporting portions 34B that support the torso of the passenger P from the left-right direction outer sides. The backrest 34 is structured to include a back frame 36 (see FIG. 8) that is a frame member, a back pad 38 that is supported by the back frame 36, and a back skin 40 that covers the back pad 38.

As shown in FIG. 8, the back frame 36 has a pair of left and right side frames 39 that extend in the vertical direction (the height direction of the backrest 34) at the left and right side portions of the backrest 34, an upper frame (not shown) that spans between the upper end portions of the left and right side frames 39, and a back surface panel 41 that spans between the rear end portions of the lower portions of the left and right side frames 39.

The left and right side frames 39 are formed, for example, in elongated shapes and by metal plates, and are disposed in postures in which the length directions run along the vertical direction and the thickness directions run along the left-right direction. The lower end portions of the left and right side frames 39 are connected, via a known reclining mechanism, to the rear end portions of the left and right side frames 16 of the cushion frame 14. The upper frame is formed, for example, by bending a metal pipe in a substantial upside-down U-shape, and is fixed by means such as welding or the like to the upper end portions of the left and right side frames 39. The back surface panel 41 is formed, for example, in an elongated shape and by a metal plate, and is disposed in a posture in which the length direction runs along the left-right direction and the thickness direction runs along the front-rear direction. The length direction both end portions of the back surface panel 41 are fixed to the lower portions of the left and right side frames 39 by means such as welding or the like.

The back pad 38 is structured by a foamed body of urethane foam or the like for example, and is attached to the back frame 36 from the front side. The back pad 38 is structured by a back pad main body portion 38A that structures the back main body portion 34A, and left and right back pad side portions 38B that structure the left and right back side supporting portions 34B. The left and right back pad side portions 38B bulge-out further toward the front side than the back pad main body portion 38A, and are molded in shapes that ensure the ability to support the sides of the torso of the passenger P. The back skin 40 that covers the back pad 38 is formed in the shape of a bag by plural fabric pieces of cloth, leather, synthetic leather, PVC or the like being sewn together.

Main Portions of Present Embodiment

The supporting force adjusting surface 50, the back side supporting portions 34B, the side reinforcing portions 60, and the lower surface reinforcing portions 70 that are main portions of the present embodiment are described next.

(Supporting Force Adjusting Surface)

In the present embodiment, the front surface of the upper portion of the backrest 34, i.e., the front surface of the backrest 34 at the region that is positioned at the height of the shoulder blades of the passenger P, is the supporting force adjusting surface 50. The resistance, with respect to displacement of the passenger P in the left-right direction, of the left-right direction both side portions of the supporting force adjusting surface 50 is set to be larger than that of the left-right direction central portion. The structures illustrated in FIG. 4 through FIG. 6 are concrete examples of the supporting force adjusting surface 50.

Figure 4:
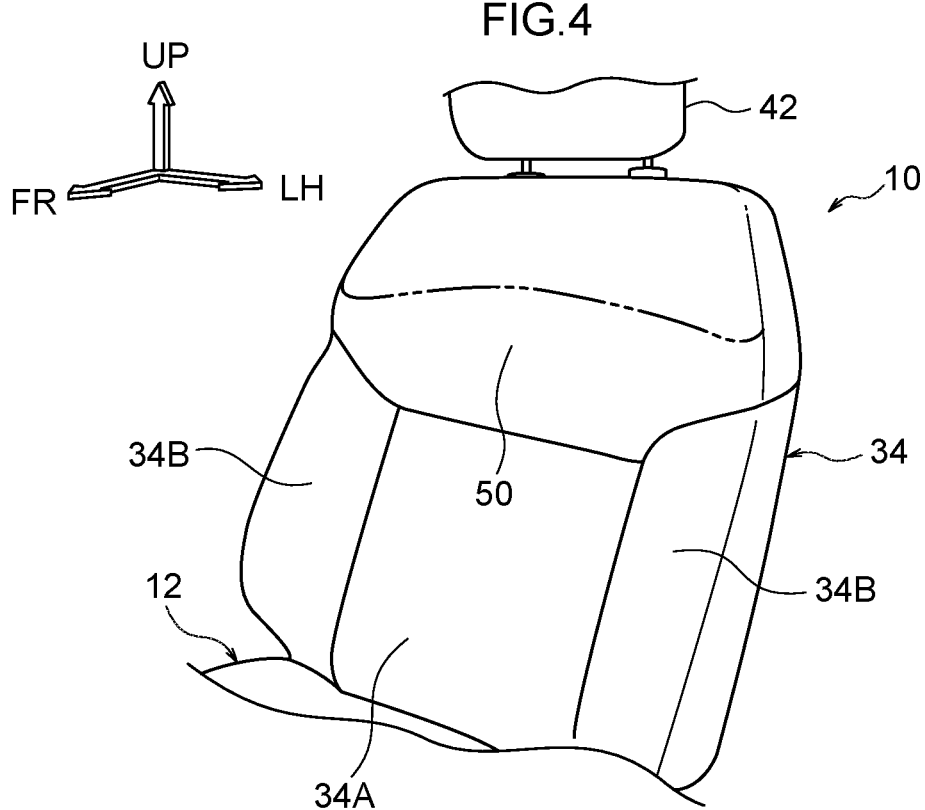
FIG. 4 is a perspective view showing an example in which a front surface of an upper portion of a backrest is formed in an arc shape that is concave toward a rear side of the backrest as seen in a plan view.

In the example shown in FIG. 4, the supporting force adjusting surface 50 (i.e., the front surface of the upper portion of the backrest 34) is formed in the shape of an arc that is concave toward the rear side of the backrest 34 as seen in a plan view (refer to the two-dot chain line in FIG. 4).

Figure 5:
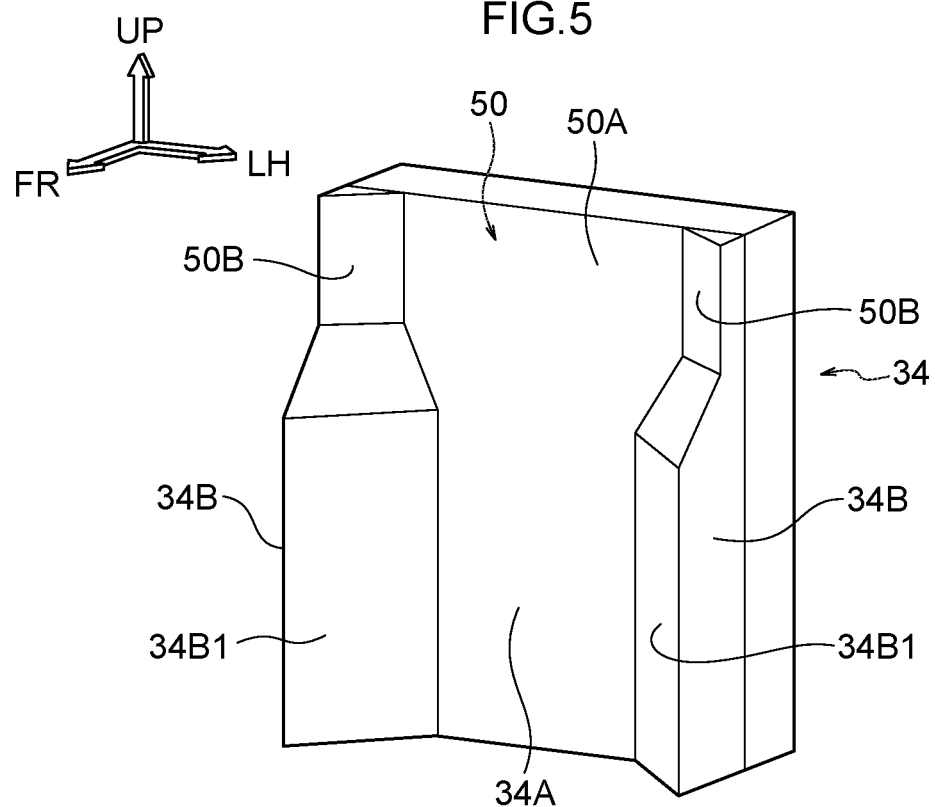
FIG. 5 is a perspective view showing an example in which inclined surfaces are formed at left-right direction both side portions of the front surface of the upper portion of the backrest.

In the example shown in FIG. 5, at the supporting force adjusting surface 50, the left-right direction central portion is a planar portion 50A that is formed in a substantially planar shape, and the left-right direction both side portions are left and right inclined surfaces 50B that are inclined toward the front side of the backrest 34 on progression toward outer sides in the left-right direction. These inclined surfaces 50B are disposed so as to be further apart from one another in the left-right direction than the left and right back side supporting portions 34B. Angles of inclination, with respect to the left-right direction, of the inclined surfaces 50B are set to be smaller than passenger supporting surfaces 34B 1 of the left and right back side supporting portions 34B.

Figure 6:
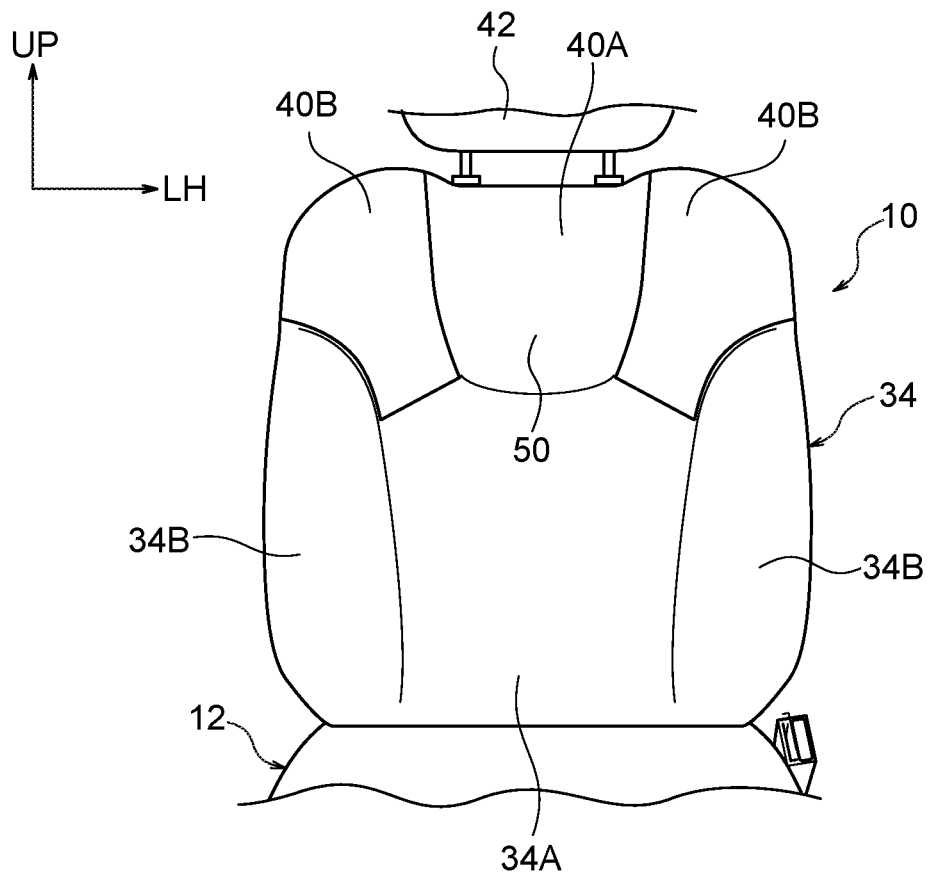
FIG. 6 is a front view showing an example in which a coefficient of friction of a left-right direction central portion at the front surface of the upper portion of the backrest is set to be lower than that at left-right direction both side portions.

In the example shown in FIG. 6, at the back skin 40, a fabric piece 40A that structures the left-right direction central portion of the supporting force adjusting surface 50, and left and right fabric pieces 40B that structure the left-right direction both side portions of the supporting force adjusting surface 50, are different. Due thereto, the coefficient of friction of the left-right direction both side portions of the supporting force adjusting surface 50 is set to be larger than that of the left-right direction central portion.

At the backrest 34 at which the above-described supporting force adjusting surface 50 is provided, when the vehicle is traveling on an uneven road surface, the left-right direction both side portions of the supporting force adjusting surface 50 (the regions at which the above-described resistance is set to be large) do not contact the upper portion of the back portion B of the passenger P, and, due thereto, the exciting force that is transmitted from the upper portion of the backrest 34 to the back portion B of the passenger P is reduced. Due thereto, "body shaking" is suppressed. On the other hand, at the time of cornering of the vehicle or at the time when the vehicle is changing lanes, the left-right direction both side portions of the supporting force adjusting surface 50 (the regions at which the above-described resistance is set to be large) contact the upper portion of the back portion of the passenger P, and, due thereto, the upper body of the passenger P is supported well by the backrest 34. Due thereto, "wobbling" is suppressed.

Namely, in "wobbling" in which the pelvis and the upper body of the passenger P are displaced in the left-right direction and the rolling direction at the time of cornering or at the time of changing lanes, the displacement amplitude is large, but the acceleration is low. In "body shaking" that arises due to irregularity of the road surface, the acceleration of the input vibration is high, but the displacement amplitude is small. Therefore, with respect to movement of a large displacement and a low acceleration, due to the upper body of the passenger P being supported by the backrest 34, the passenger P moves integrally with the vehicle seat 10. Further, with respect to movement of small amplitude and high acceleration, the structure generates relative displacement between the vehicle seat 10 and the passenger P and inhibits the exciting force caused by the vehicle seat 10 from being transmitted to the passenger P. In this way, the vehicle seat 10 is a structure at which the effects of supporting the passenger P change in accordance with the amplitude and acceleration.

(Back Side Supporting Portions)

In the present embodiment, the left and right back side supporting portions 34B, which project-out toward the front side of the backrest 34 at further toward the lower side than the upper portion of the chest portion C of the passenger P and at a height that corresponds at least to the lower portion of the chest portion C of the passenger P, are provided at the left-right direction both side portions of the backrest 34. Specifically, the left and right back side supporting portions 34B, which project out toward the front side of the backrest 34 at a height corresponding to a range from the lower portion of the chest portion C of the passenger P (refer to the dotted regions in FIG. 12) to the lumbar region W, are provided at the left-right direction both side portions of the backrest 34. In a case in which the passenger P who is seated in the vehicle seat 10 has a physique corresponding to a JM50, the height that corresponds to the aforementioned "lower portion of the chest portion C" is the height at which the seventh rib and the eighth rib are positioned at the side portions of the torso of the passenger P. The upper portion of the backrest 34 at which the above-described supporting force adjusting surface 50 is provided is disposed further toward the upper side than the left and right back side supporting portions 34B, and is positioned so as to be set back further toward the rear side than the left and right back side supporting portions 34B.

The left and right back side supporting portions 34B are formed such that, at the time when the upper body of the passenger P is swung in the rolling direction with his/her pelvis being the fulcrum, such as at the time when the vehicle is traveling on an uneven road surface or the like, first, the lower portion of the chest portion C of the passenger P is supported by (abuts) the upper portions of the left and right back side supporting portions 34B. Further, in the present embodiment, width dimension W1 (see FIG. 1) in the left-right direction between the regions, which the lower portion of the chest portion C of the passenger P abuts in the beginning as described above, at the left and right back side supporting portions 34B is set to be within a range of, for example, 115% to 125% of width dimension W2 (see FIG. 12) in the left-right direction between the regions, which abut the left and right back side supporting portions 34B in the beginning, at the lower portion of the chest portion C of the passenger P. Due thereto, "body shaking" is suppressed more.

Namely, in "body shaking" in which the upper body of the passenger P is swung by the vehicle seat 10 accompanying the sprung mass of the vehicle body rolling due to irregular road input caused by unevenness of the road surface, due to the passenger P being supported at the height of the lower portion of the chest portion C of the passenger P and at the above-described width dimension of 115% to 125%, input to the thorax is dodged, and vibrating of the head portion and the chest portion C is suppressed. Due thereto, the sensation of the body being shaken can be reduced the most. If a position, which is higher than the aforementioned height, at the torso of the passenger P is supported by the back side supporting portions 34B, the chest portion C of the passenger P is excited strongly, and the head portion is greatly shaken. Further, if a position, which is lower than the aforementioned height, at the torso of the passenger P is supported by the back side supporting portions 34B, the sensation of the body being shaken is reduced, but the thorax topples and is unstable at the time of low-frequency movement. Further, at a supporting width that is wider than the above-described width dimension of 115% to 125%, due to the chest portion C moving later than the vehicle seat 10, the discomfort of the chest portion C being hit by the back side supporting portions 34B arises. Further, at a supporting width that is narrower than the above-described width dimension of 115% to 125%, the thorax is sandwiched between the left and right back side supporting portions 34B, and the upper body is directly vibrated, and therefore, the head portion is greatly shaken.

In this way, in the present embodiment, with respect to vibration input whose acceleration is high and whose amplitude is low and that is a cause of "body shaking", the back side supporting portions 34B and the chest portion C do not contact one another, and input is dodged. With respect to input whose acceleration is low and whose amplitude is large and that is a cause of "wobbling", the upper portions of the back side supporting portions 34B and the chest portion C contact one another, and the upper body of the passenger P is supported so as to not topple.

Note that, in the present embodiment, the left and right back side supporting portions 34B are formed such that, when the upper body of the passenger P is swung in the rolling direction with his/her pelvis being the fulcrum as described above, first, the lower portion of the chest portion C of the passenger P abuts the upper portions of the left and right back side supporting portions 34B. In the example shown in FIG. 5, the left-right direction both side portions of the upper portion of the backrest 34 (the regions where the left and right inclined surfaces 50B are formed) are not included in the left and right back side supporting portions 34B. In other words, the left and right back side supporting portions 34B are portions that bulge-out in step shapes or in substantial step shapes toward the front side and the seat width direction central side, with respect to the left-right direction both side portions of the upper portion of the backrest 34 (the region that is further toward the upper side than the lower portion of the chest portion C of the passenger P).

(Side Reinforcing Portions)

Figure 13:
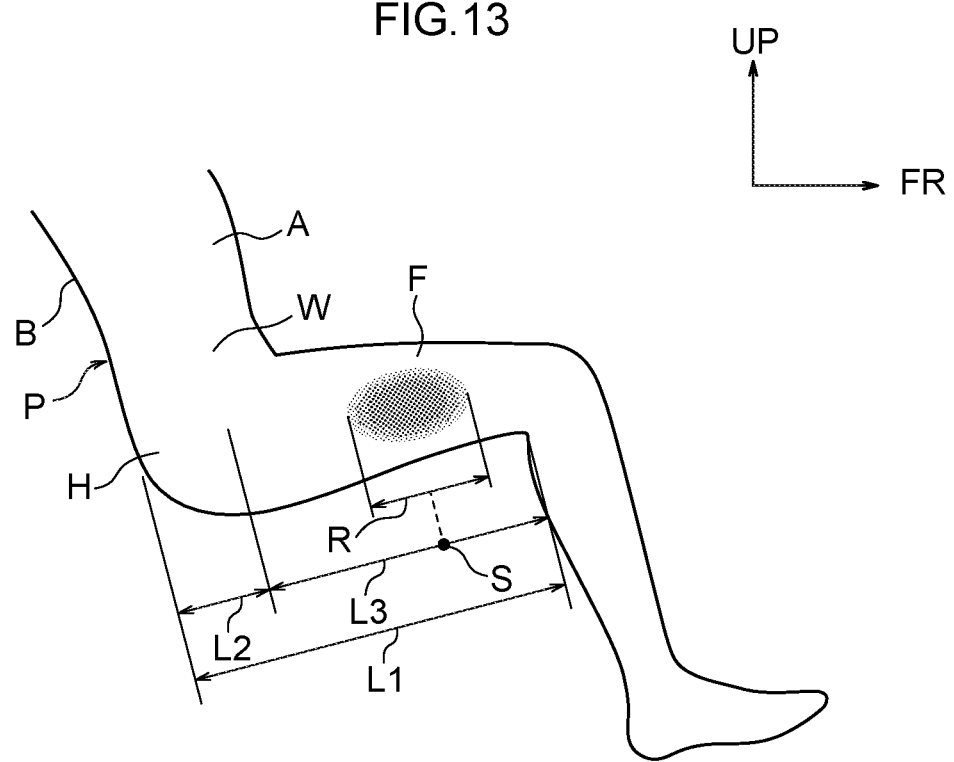
FIG. 13 is a schematic drawing for explaining effects of the side reinforcing portions.

In the present embodiment, the seat cushion 12 has the left and right side reinforcing portions 60 that reinforce portions of the cushion pad 30 at the left-right direction outer sides and obliquely lower sides of the front-rear direction central portions of the thigh portions F of the passenger P. As shown in FIG. 13, the aforementioned "front-rear direction central portions of the thigh portions F" means regions that are within a range R of 60 mm or more in the front-rear direction and whose centers are position S that is 60% of the way from the trochanter toward the front side (the side of the knees), given that distance L3 between the trochanter and the area behind the knee, which is obtained by subtracting distance L2 between the seated buttocks and the trochanter from distance L1 between the seated buttocks and the area behind the knees, which distances are prescribed by a database of dimensions of the human body, is considered to be the entire length (100%). The structures shown in FIG. 7 through FIG. 9 are specific examples of the left and right side reinforcing portions 60.

Figure 7:
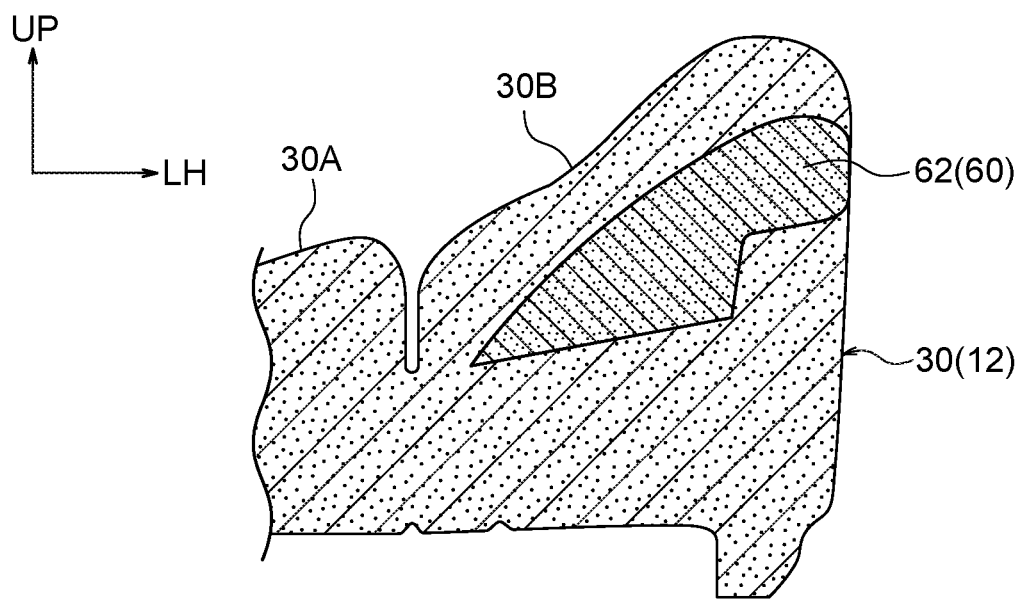
FIG. 7 is a cross-sectional view showing an example in which a side high-hardness member is a side reinforcing portion.

In the example shown in FIG. 7, the left and right side reinforcing portions 60 are left and right side high-hardness members 62 that are embedded within the cushion pad 30 at the left-right direction outer sides and obliquely lower sides of the front-rear direction central portions of the thigh portions F of the passenger P. (The side high-hardness member 62 that is at the right side is omitted from FIG. 7.) These side high-hardness members 62 are structured by foamed bodies (e.g., foamed polypropylene, chip urethane, or the like) whose rigidities are higher than that of the cushion pad 30, and are embedded in the cushion pad 30 by integral foam molding.

In the example shown in FIG. 8, the left and right side reinforcing portions 60 are left and right supporting frames 64 that are disposed at the left-right direction outer sides and obliquely lower sides of the front-rear direction central portions of the thigh portions F of the passenger P, and are fixed to the left and right side frames 16 of the seat cushion 12, and support the cushion pad 30 from the lower side. These supporting frames 64 are formed by bending wires for example, and are fixed to the side frames 16 by means such as welding or the like.

Figure 9:
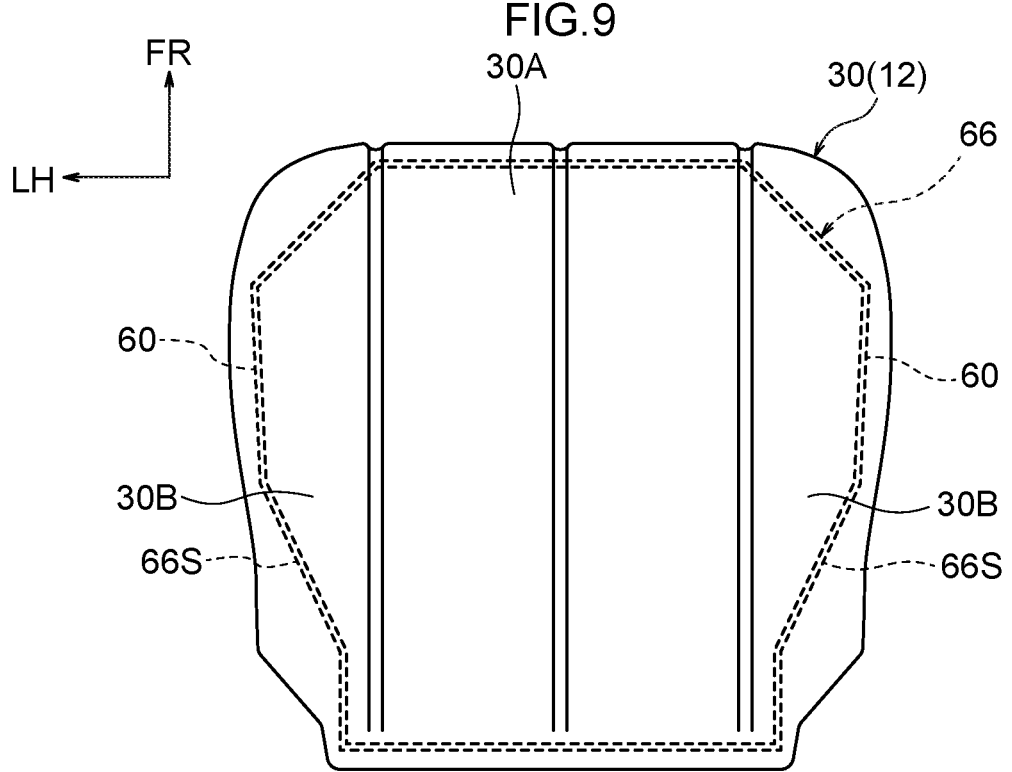
FIG. 9 is a plan view showing an example in which portions of a wire frame are side reinforcing portions.

In the example shown in FIG. 9, a wire frame 66 is embedded in the outer peripheral portion of the cushion pad 30. Left and right side portions 66S of this wire frame are bent so as to be convex toward the left-right direction outer sides and the upper side. Further, at the left and right side portions 66S, the regions, which are disposed at the left-right direction outer sides and obliquely lower sides of the front-rear direction central portions of the thigh portions F of the passenger P, are the left and right side reinforcing portions 60.

At the seat cushion 12 that is provided with the left and right side reinforcing portions 60 such as those described above, portions of the cushion pad 30 are reinforced from the left-right direction outer sides and obliquely lower sides of the front-rear direction central portions of the thigh portions F of the passenger P. Due thereto, "wobbling" is suppressed.

Namely, due to the thigh portions F of the passenger P being supported from the left-right direction outer sides and obliquely lower sides at the ranges R shown in FIG. 13, the passenger P can more effectively transmit the force of the thigh portions F to the cushion side supporting portions 12B, and the body of the passenger P is supported by the force of the thigh portions F. If there is support at further toward the front side than the above-described ranges R, the distance from the bases of the thigh portions F to the supported positions (the moment arms) are large, and it is difficult for the thigh portions F to be pushed against the cushion side supporting portions 12B. Further, if there is support at further toward the rear side than the above-described ranges R, there is little displacement of the thigh portions F at the supported positions, and sufficient force for pushing the thigh portions F against the cushion side supporting portions is not generated. At the time when "wobbling" arises, the passenger P is maintained in the seated posture by the muscle forces of the thigh portions F and the lateral regions of the abdomen, and therefore, the sense of a burden and the fatigue that accompany posture control arise. Because the maximum force generated by the muscles of the thigh portions F is larger than that of the muscles of the lateral regions of the abdomen, by improving the feeling of support of the thigh portions F, even if the force generated by the muscles of the thigh portions F increases a little, the riding posture can be maintained effectively while the passenger P feels a lesser sense of a burden overall.

(Lower Surface Reinforcing Portions)

In the present embodiment, the seat cushion 12 has the left and right lower surface reinforcing portions 70 that reinforce portions of the lower surface (the reverse surface) of the cushion pad 30 at the left-right direction outer sides and obliquely lower side of the buttock portions H of the passenger P. The structures illustrated in FIG. 10 and FIG. 11 are concrete examples of the left and right lower surface reinforcing portions 70.

In the example shown in FIG. 10, the left and right lower surface reinforcing portions 70 are left and right supporting plates 72 that are formed by, for example, metal plates being bent into V-shapes in cross-section, and are disposed at the left-right direction outer sides and obliquely lower side of the buttock portions H of the passenger P. These supporting plates 72 are disposed between the left and right side frames and the S-springs 24 of the seat cushion 12, and are fixed to the left and right side frames 16. The supporting plates 72 support the lower surface of the cushion pad 30 by upper surfaces 72A that are inclined so as to slope downward toward the seat left-right direction central side. Concretely, at the lower surface of the cushion pad 30, the supporting plates 72 support, from the lower side, the border regions of the cushion pad main body portion 30A and the cushion pad side portions 30B, and portions at the peripheries of these border portions.

Figure 11:
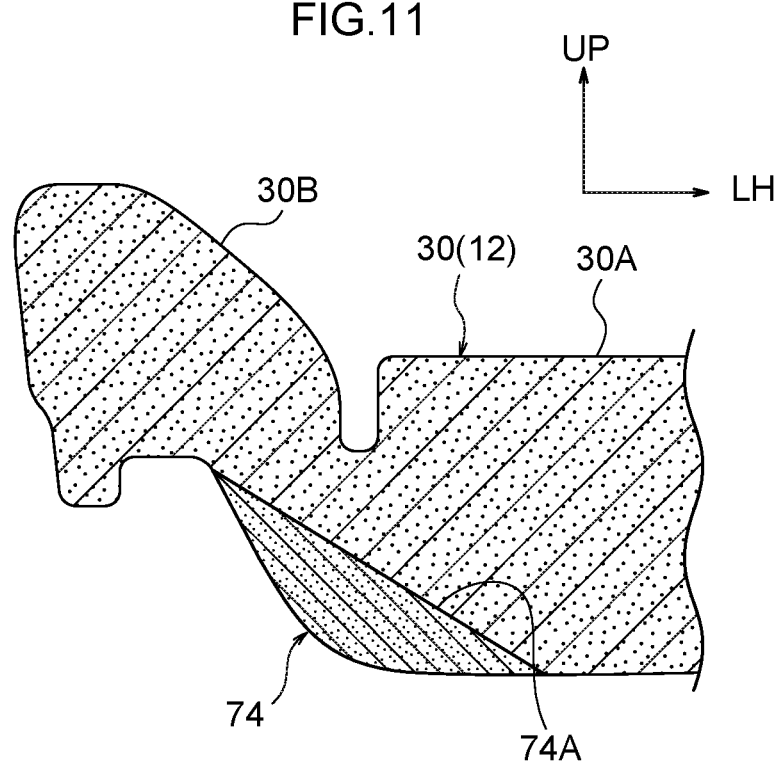
FIG. 11 is a cross-sectional view showing an example in which a lower surface high-hardness member is a lower surface reinforcing portion.
Figure 12:
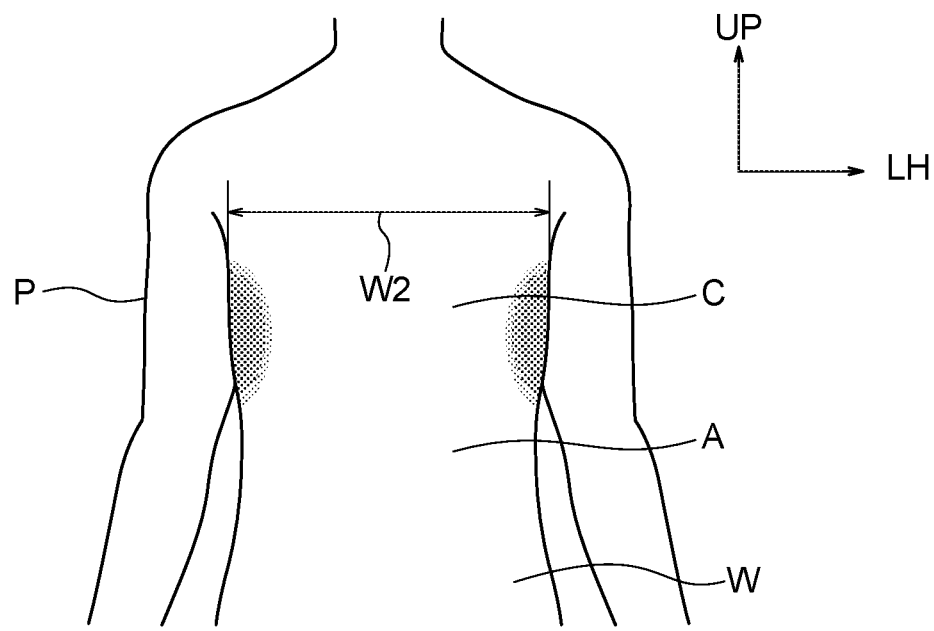
FIG. 12 is a schematic drawing for explaining supporting of a lower portion of a chest portion by back side supporting portions.

In the example shown in FIG. 11, the left and right lower surface reinforcing portions 70 are lower surface high-hardness members 74 that are formed from foamed bodies (e.g., foamed polypropylene, chip urethane, or the like) whose rigidity is higher than that of the cushion pad 30, and are disposed at the left-right direction outer sides and obliquely lower side of the buttock portions H of the passenger P. These lower surface high-hardness members 74 have cross-sections that are substantially triangular as seen in the front-rear direction. Upper surfaces 74A, which are inclined at downward slopes toward the seat left-right direction central side, are fixed to the lower surface of the cushion pad 30. Concretely, at the lower surface of the cushion pad 30, these lower surface high-hardness members 74 are fixed to the border regions of the cushion pad main body portion 30A and the cushion pad side portions 30B, and portions at the peripheries of these border portions. Due thereto, there is a structure that suppresses deformation of the regions, to which the lower surface high-hardness members 74 are fixed, at the lower surface of the cushion pad 30.

At the seat cushion 12 that is provided with the left and right lower surface reinforcing portions 70 such as those described above, portions of the cushion pad 30 are reinforced from the left-right direction outer sides and obliquely lower sides of the buttock portions H of the passenger P, and the rigidity and the damping performance of the cushion pad 30 at these reinforced regions is improved. Due thereto, "wobbling" is suppressed.

Namely, at the time of rolling of the pelvis of the passenger P that is due to the occurrence of "wobbling", deformation of the lower surface of the cushion pad 30 at the left-right direction both end portions of the buttock portions H is suppressed, and the generated forces toward the left-right direction outer sides and obliquely lower sides, that are due to compression of the cushion pad 30, are received. In this way, large repulsive force and damping force are exhibited in the deforming of the cushion pad 30 with respect to the rolling of the pelvis that is the fulcrum of the "wobbling". Due thereto, rolling of the pelvis can be suppressed, and the feeling of wobbling can be effectively reduced.

(Operation and Effects)

Operation and effects of the present embodiment are described next.

In the vehicle seat 10 of the above-described structure, the front surface of the upper portion of the backrest is the supporting force adjusting surface 50 at which the resistance to relative displacement of the passenger P in the left-right direction is set to be larger at the left-right direction both side portions than at the left-right direction central portion. Therefore, when the vehicle travels on an uneven road surface, i.e., when the backrest 34 vibrates in the left-right direction at a high acceleration and a small amplitude, the left-right direction both side portions of the front surface of the upper portion of the backrest 34 (the regions where the above-described resistance is set to be large) do not contact the upper portion of the back portion B of the passenger P, and, due thereto, the exciting force that is transmitted from the upper portion of the backrest 34 to the back portion B of the passenger P is reduced. Due thereto, "body shaking" can be suppressed.

On the other hand, at the time of cornering of the vehicle or at the time when the vehicle changes lanes, i.e., at the time when the upper body of the passenger P tilts in the left-right direction (the lateral direction) at a low acceleration and a large amplitude, the left-right direction both side portions of the front surface of the upper portion of the backrest 34 (the regions where the above-described resistance is set to be large) contact the upper portion of the back portion B of the passenger P, and due thereto, the upper body of the passenger P is supported well by the backrest 34. Due thereto "wobbling" can be suppressed.

Further, at the vehicle seat 10, the left and right side reinforcing portions 60 of the seat cushion 12 reinforce portions of the cushion pad 30 at the left-right direction outer sides and obliquely lower sides of the front-rear direction central portions of the thigh portions F of the passenger P. Due thereto, it is easy for the passenger P to transmit the force of the thigh portions P to the left and right cushion side supporting portions 12B of the seat cushion 12, and it is easy to support the upper body by the force of the thigh portions F. Therefore, "wobbling" can be suppressed more.

Further, at the vehicle seat 10, the left and right lower surface reinforcing portions 70 of the seat cushion 12 reinforce portions of the lower surface of the cushion pad 30 at the left-right direction outer sides and obliquely lower side of the buttock portions H of the passenger P. Due thereto, deformation of the cushion pad 30 is suppressed at the left-right direction outer sides and obliquely lower side of the buttock portions H of the passenger P, and rolling of the pelvis of the passenger P is suppressed. Therefore, "wobbling" can be suppressed even more.

Furthermore, at the vehicle seat 10, as described above, portions of the cushion pad 30 are reinforced at the left-right direction outer sides and obliquely lower sides of the front-rear direction central portions of the thigh portions F, and portions of the lower surface of the cushion pad 30 are reinforced at the left-right direction outer sides and obliquely lower side of the buttock portions H. Therefore, the seating comfort is good as compared with, for example, a structure in which the cushion pad 30 is reinforced beneath the thigh portions F and the buttock portions H.

Due to the above, in accordance with the present embodiment, both suppressing of wobbling and suppressing of body shaking can be achieved, and a good seating comfort can be ensured. Moreover, because there is no need to install a control device or an actuator or the like in the backrest 34, the structure can be made to be simple. Further, requirements on the layout in order to install a control device or an actuator or the like in the backrest become unnecessary, and, in addition, an increase in costs, and in the number of assembly steps and in the weight can be suppressed.

Further, in the vehicle seat 10 relating to the present embodiment, the left and right back side supporting portions 34B, which project-out toward the front side of the backrest 34 at a height corresponding to a range from the lower portion of the chest portion C of the passenger P to the lumbar region W, are provided at the left-right direction both side portions of the backrest 34. Therefore, at the time when the upper body of the passenger P is swung in a rolling direction with his/her pelvis being the fulcrum when the vehicle is traveling on an uneven road surface or the like, first, the lower portion of the chest portion C is supported by (abuts) the back side supporting portions 34B. Due thereto, as compared with a structure in which, first, the upper portion of the chest portion C or an abdominal region A is supported by the back side supporting portions 34B, input to the thorax is dodged, and vibration of the chest portion C and the head portion is suppressed. Therefore, "body shaking" can be suppressed more.

Further, in the present embodiment, any of the examples shown in FIG. 4 through FIG. 6 is employed as the supporting force adjusting surface 50. Therefore, the above-described resistance can be set by a simple structure. Further, in the present embodiment, any of the examples shown in FIG. 7 through FIG. 9 is employed as the left and right side reinforcing portions 60, and either of the examples shown in FIG. 10 and FIG. 11 is employed as the left and right lower surface reinforcing portions 70. Therefore, the left and right side reinforcing portions 60 and the left and right lower surface reinforcing portions 70 can be made to be simple structures.

(Effects of Present Embodiment)

In the present embodiment, with respect to "wobbling" that arises at the time of cornering or at the time of changing lanes, not only can the upper body of the passenger, at which the amplitude is large, be supported by the supporting force adjusting surface 50 of the upper portion of the backrest 34, but also, rolling of the pelvis that is the center of rotation of the "wobbling" is suppressed by the left and right lower surface reinforcing portions 70. Due thereto, a more effective reduction of fatigue, a reduction in the sense of unease owing to the stability of the posture, and more accurate driving operation are possible.

In the present embodiment, owing to the left and right side reinforcing portions 60, at the time of "wobbling", the passenger P can maintain his/her posture by a lower burden on the muscles, and a reduction in fatigue is possible.

In the present embodiment, owing to the optimal supporting shape of the back side supporting portions 34B, transmission of exciting force from the vehicle seat 10 to the chest portion C of the passenger P due to "body shaking" is suppressed, and shaking of the head portion is suppressed. Due thereto, a reduction in the discomfort that is due to "body shaking", and a reduction in the sense of unease that is due to shaking of the field of vision, are possible.

Conventionally, there is a trade-off between "wobbling" and "body shaking". In the present embodiment, by employing both support at the upper portion of the backrest 34 and support at the back side supporting portions 34B that change in accordance with the amplitude of displacement and the acceleration, the aforementioned trade-off is eliminated, and both of the above-described phenomena can be mitigated.

In the present embodiment, because there is no need for a control device and an actuator, the materials cost, the number of assembly processes, and an increase in weight can be suppressed.

Note that the above-described embodiment is structured such that the width dimension W1 (see FIG. 1) in the left-right direction between the regions, which are abutted in the beginning by the lower portion of the chest portion C of the passenger P at the time of "wobbling", at the left and right back side supporting portions 34B is set to be constant. However, the present disclosure is not limited to this. For example, there may be a structure in which an adjusting mechanism for manually adjusting the width dimension W1 is provided at the backrest 34.

Further, the present embodiment is structured such that the dimensions and the like of the respective portions of the vehicle seat 10 are set so as to suit the passenger P who has a physique corresponding to a JM50. However, the dimensions of the respective portions of the vehicle seat relating to the present disclosure can be changed appropriately in accordance with the target physique of the vehicle in which the vehicle seat is installed, or the standard physique of an adult in the country in which the vehicle is used. For example, if the country in which the vehicle, in which the vehicle seat relating to the present disclosure is installed, is used is the United States, the dimensions of the respective portions can be set so as to suit a physique corresponding to an AM50 or an AF05.

In addition, the present disclosure can be implemented by being modified in various ways within a scope that does not depart from the gist thereof. Further, the scope of the right of the present disclosure is, of course, not limited to the above-described embodiments.

What is claimed is:

1. A vehicle seat, comprising:
   a seat cushion that supports buttock portions and thigh portions of a passenger having a physique corresponding to AM50; and
   a backrest, that supports a back portion of the passenger,
   wherein at the backrest, resistance to relative displacement of the passenger in a left-right direction is larger at both left-right direction side portions of a front surface of an upper portion than at a left-right direction central portion thereof,
   wherein the seat cushion has:
      left and right side reinforcing portions that reinforce portions of a cushion pad at left-right direction outer sides, and at obliquely lower sides with respect to front-rear direction central portions of the thigh portions of the passenger, the front-rear direction central portions of the thigh portions of the passenger being regions that are within a range of 60 mm or more in the front-rear direction and have centers that are 60% of a distance from a trochanter of the passenger to a side of a knee of the passenger, given that a distance between the trochanter and an area behind the knee, which is obtained by subtracting a distance between the seated buttock portions and the trochanter from a distance between the seated buttock portions and the area behind the knee, which distances are prescribed by a database of dimensions of human bodies, is considered to be the entire distance from the trochanter to the side of the knee, and left and tight lower surface reinforcing portions that reinforce portions of a lower surface of the cushion pad at left-right direction outer sides, and at obliquely lower sides with respect to the buttock portions of the passenger, wherein left and right back side supporting portions are provided at both left-right direction side portions of the backrest, the left and right back side supporting portions projecting outward toward a front side of the backrest at a location that is closer to a lower portion of a chest portion of the passenger than an upper portion of the chest portion of the passenger and at a height corresponding at least to the lower portion of the chest portion of the passenger, the lower portion of the chest portion corresponding to a seventh and eighth rib of the passenger having the physique corresponding to AM50 when seated, a width between the left and tight back side supporting portions at the height corresponding to a range from 115% to 125% of a width dimension of the lower portion of the chest portion of the passenger.

2. The vehicle seat of claim 1, wherein the front surface of the upper portion of the backrest is formed in an arc that is concave toward a rear side of the backrest as seen in a plan view.

3. The vehicle seat of claim 1, wherein inclined surfaces, which are inclined toward a front side of the backrest on progression toward outer sides in a left-right direction, are formed at both of the left-right direction side portions of the front surface of the upper portion of the backrest.

4. The vehicle seat of claim 1, wherein a coefficient of friction of both of the left-tight direction side portions of the front surface of the upper portion of the backrest is higher than at a left-right direction central portion of the front surface of the upper portion of the backrest.

5. The vehicle seat of claim 1, wherein the left and right side reinforcing portions comprise left and right side high-hardness members that are formed from foamed bodies of higher rigidities than the cushion pad, and that are embedded in the cushion pad at the left-right direction outer sides, and at the obliquely lower sides with respect to the front-rear direction central portions of the thigh portions of the passenger.

6. The vehicle seat of claim 1, wherein the left and right side reinforcing portions comprise left and right supporting frames that are disposed at the left-right direction outer sides, and at the obliquely lower sides with respect to the front-rear direction central portions of the thigh portions of the passenger, that are fixed to left and right side frames of the seat cushion, and that support the cushion pad from a lower side.

7. The vehicle seat of claim 1, further comprising a wire frame, wherein:

the wire frame is embedded within an outer peripheral portion of the cushion pad, left and right side portions of the wire frame are bent so as to be convex toward the left-right direction outer sides and an upper side, and the left and right side reinforcing portions are structured by regions of the left and right side portions, which regions are disposed at the left-right direction outer sides, and at the obliquely lower sides with respect to the front-rear direction central portions of the thigh portions of the passenger.

8. The vehicle seat of claim 1, wherein the left and right lower surface reinforcing portions comprise left and right supporting plates that are disposed at the left-right direction outer sides, and at the obliquely lower sides with respect to the buttock portions of the passenger, that are fixed to left and right side frames of the seat cushion, and that support the lower surface of the cushion pad by means of upper surfaces that are inclined at a downward slope toward a seat left-right direction central side.

9. The vehicle seat of claim 1, wherein the left and right lower surface reinforcing portions comprise left and right lower surface high-hardness members that are formed from foamed bodies of higher rigidity than the cushion pad, and that are disposed at the left-right direction outer sides, and at the obliquely lower sides with respect to the buttock portions of the passenger, and whose upper surfaces, which are inclined at a downward slope toward a seat left-right direction central side, are fixed to the lower surface of the cushion pad.

* * * * *